US012494485B2

(12) United States Patent
Cho et al.

(10) Patent No.: US 12,494,485 B2
(45) Date of Patent: Dec. 9, 2025

(54) SULFUR ELECTRODE AND METHOD FOR MANUFACTURING SAME

(71) Applicant: SK INNOVATION CO., LTD., Seoul (KR)

(72) Inventors: Gyu Bong Cho, Jinju-si (KR); Ki-won Kim, Jinju-si (KR); Jung-pil Noh, Jinju-si (KR); Jou Hyeon Ahn, Jinju-si (KR); Hyo Jun Ahn, Jinju-si (KR); Kwon-Koo Cho, Jinju-si (KR); Tae Hyeon Nam, Jinju-si (KR)

(73) Assignee: SK On Co., Ltd., Seoul (KR)

( * ) Notice: Subject to any disclaimer, the term of this patent is extended or adjusted under 35 U.S.C. 154(b) by 1218 days.

(21) Appl. No.: 17/311,410

(22) PCT Filed: Nov. 21, 2019

(86) PCT No.: PCT/KR2019/016007
§ 371 (c)(1),
(2) Date: Dec. 17, 2021

(87) PCT Pub. No.: WO2020/122452
PCT Pub. Date: Jun. 18, 2020

(65) Prior Publication Data
US 2022/0102722 A1 Mar. 31, 2022

(30) Foreign Application Priority Data
Dec. 10, 2018 (KR) .................. 10-2018-0158102

(51) Int. Cl.
*H01M 4/583* (2010.01)
*H01M 4/04* (2006.01)
(Continued)

(52) U.S. Cl.
CPC ......... *H01M 4/583* (2013.01); *H01M 4/0404* (2013.01); *H01M 4/366* (2013.01);
(Continued)

(58) Field of Classification Search
CPC .... H01M 4/663; H01M 4/0404; H01M 4/625; H01M 4/13; C25D 9/04
See application file for complete search history.

(56) References Cited

U.S. PATENT DOCUMENTS

2016/0248087 A1* 8/2016 Kim .................. H01M 4/625

FOREIGN PATENT DOCUMENTS

JP          5153056 B1     2/2013
KR   10-2003-0027395 A    4/2003
(Continued)

OTHER PUBLICATIONS

English translation of JP-5153056-B2 (Year: 2013).*
(Continued)

*Primary Examiner* — Kourtney R S Carlson
(74) *Attorney, Agent, or Firm* — IP & T GROUP LLP

(57) ABSTRACT

A sulfur electrode and a method for manufacturing the same are disclosed. The method for manufacturing the sulfur electrode includes: growing carbon fibers on a surface of stainless steel; connecting the stainless steel on which the carbon fibers are grown to a cathode of a current controller in an aqueous solution in which sulfur ions are dissolved; and forming a sulfur thin film on each of surfaces of the carbon fibers grown on the surface of the stainless steel and in each of spaces between the carbon fibers by controlling a current of the current controller.

8 Claims, 16 Drawing Sheets

(51) Int. Cl.
  *H01M 4/36* (2006.01)
  *H01M 4/38* (2006.01)
  *H01M 4/62* (2006.01)
  *H01M 4/66* (2006.01)
(52) U.S. Cl.
  CPC ............. *H01M 4/38* (2013.01); *H01M 4/625* (2013.01); *H01M 4/662* (2013.01)

(56) References Cited

FOREIGN PATENT DOCUMENTS

KR   10-2005-0074818 A   7/2005
KR   10-2015-0045363 A   4/2015

OTHER PUBLICATIONS

He. B. et al. "Incorporating Sulfur Inside the Pores of Carbons for Advanced Lithium-Sulfur Batteries : An Electrolysis Approach". ACS NANO. Jan. 6, 2016. vol. 10, No. I, pp. 1-22.
International Search Report of International application No. PCT/KR2019/016007. May 28, 2020.
Written Opinion of International application No. PCT/KR2019/016007. May 28, 2020.

* cited by examiner

SULFUR ELECTRODE AND METHOD FOR MANUFACTURING SAME

CROSS-REFERENCE TO RELATED APPLICATIONS

This application is a National Stage Entry of PCT International Application No. PCT/KR2019/016007, which was filed on Nov. 21, 2019, and which claims priority from and the benefit of Korean Patent Application 10-2018-0158102, filed with the Korean Intellectual Property Office on Dec. 10, 2018, the disclosure of which are hereby incorporated by reference in its entirety.

TECHNICAL FIELD

The present disclosure relates to a sulfur electrode and a method for manufacturing the same, and more particularly, to a sulfur electrode obtained by plating carbon fibers with sulfur and a method for manufacturing the same.

BACKGROUND ART

Secondary batteries have been used as power sources for a large number of electronic devices. In accordance with development of numerous stand-alone electronic devices, the secondary battery has been widely used and has grown in importance. Recently, in accordance with the development of an electric vehicle and a power storage field, an interest in a high-capacity secondary battery has increased.

However, existing lithium ion batteries have many problems when used for electric vehicles and smart grid power storage. Since a lithium ion battery is expensive, the cost of the secondary battery accounts for about 70% or more of the purchase price of an electric vehicle. In addition, even when a lithium ion battery is used for an electric vehicle, it is difficult to achieve a high energy density of 260 Wh/kg or more, and it is also difficult to implement a lithium ion secondary battery including existing electrode materials with an energy density of 300 Wh/kg due to technical limitations.

Among candidates for a new battery system capable of achieving high energy density and a low price, the most suitable system is a sulfur battery. In the case of a sulfur battery, sulfur used as a cathode active material is inexpensive and environmentally friendly. In addition, theoretically, the sulfur battery may have a significantly high energy density of 2,600 Wh/kg. However, in the case of a sulfur battery, conductivity may be low and lithium products may be eluted.

Therefore, a sulfur battery technology for preventing low conductivity and elution of lithium products is required.

DISCLOSURE

Technical Problem

An aspect of the present disclosure may provide a sulfur electrode capable of preventing low conductivity and elution of lithium products and a method for manufacturing the same.

Technical Solution

According to an aspect of the present disclosure, a method for manufacturing a sulfur electrode includes: growing carbon fibers on a surface of stainless steel; connecting the stainless steel on which the carbon fibers are grown to a cathode of a current controller in an aqueous solution in which sulfur ions are dissolved; and forming a sulfur thin film on each of surfaces of the carbon fibers grown on the surface of the stainless steel and in each of spaces between the carbon fibers by controlling a current of the current controller.

The stainless steel may have a porous foil structure.

In the growing the carbon fibers, the carbon fibers may be grown on both surfaces of the stainless steel having the porous foil structure.

In the forming the sulfur thin film, the current controller may be controlled so that the current of the current controller is applied with a preset current value and power is supplied to the cathode for a time during which a voltage of the cathode does not exceed 3 V.

According to another aspect of the present disclosure, a sulfur electrode includes: a current collector including stainless steel having a surface on which carbon fibers are grown; and an active material formed into a sulfur thin film formed on a periphery of each of the carbon fibers, wherein the active material is formed on each of surfaces of the carbon fibers and in each of spaces between the carbon fibers in an aqueous solution in which sulfur ions are dissolved by controlling a current controller.

The current collector may include stainless steel having a porous foil structure.

The stainless steel having the porous foil structure in the current collector may have both surfaces on which the carbon fibers are grown, and the sulfur electrode may include at least one current collector.

According to still another aspect of the present disclosure, a battery includes the sulfur electrode.

Advantageous Effects

As set forth above, according to an exemplary embodiment in the present disclosure, the sulfur electrode and the method for manufacturing the same may prevent low conductivity and elution of lithium products.

In addition, the sulfur electrode and the method for manufacturing the same may implement an easy increase in capacity and may be applied to the existing battery structure.

The effects of the present disclosure are not limited to the above-mentioned effects, and other effects that are not mentioned may be obviously understood by those skilled in the art from the following description.

BEST MODE FOR INVENTION

Hereinafter, various exemplary embodiments will be described in more detail with reference to the accompanying drawings. Exemplary embodiments described in the present specification may be variously modified. Specific exemplary embodiments may be illustrated in the accompanying drawings and may be described in detail in a detailed description. However, the specific exemplary embodiments illustrated in the accompanying drawings are provided only to allow various exemplary embodiments to be easily understood. Therefore, it should be understood that the spirit of the present disclosure is not limited by the specific exemplary embodiments illustrated in the accompanying drawings, but includes all the equivalents and substitutions included in the spirit and the scope of the present disclosure.

Terms including ordinal numbers such as "first", "second", and the like may be used to describe various components. However, these components are not limited by these terms. The terms are used only to distinguish one component from another component.

It should be further understood that terms "include" and "have" used in the present specification specify the presence of features, numerals, steps, operations, components, parts described in the present specification, or combinations thereof, but do not preclude the presence or addition of one or more other features, numerals, steps, operations, components, parts, or combinations thereof. It should be understood that when one component is referred to as being "connected to" or "coupled to" another component, it may be connected directly to or coupled directly to another component or be connected to or coupled to another component, having the other component intervening therebetween. On the other hand, it should be understood that when one component is referred to as being "connected directly to" or "coupled directly to" another component, it may be connected to or coupled to another component without the other component interposed therebetween. Singular forms are intended to include plural forms unless the context clearly indicates otherwise.

Further, when it is decided that a detailed description for the known function or configuration related to the present disclosure may obscure the gist of the present disclosure, the detailed description therefor will be abbreviated or omitted. Meanwhile, the respective exemplary embodiments may be independently implemented or operated, but the respective exemplary embodiments may be implemented or operated in combination.

Figure 1:
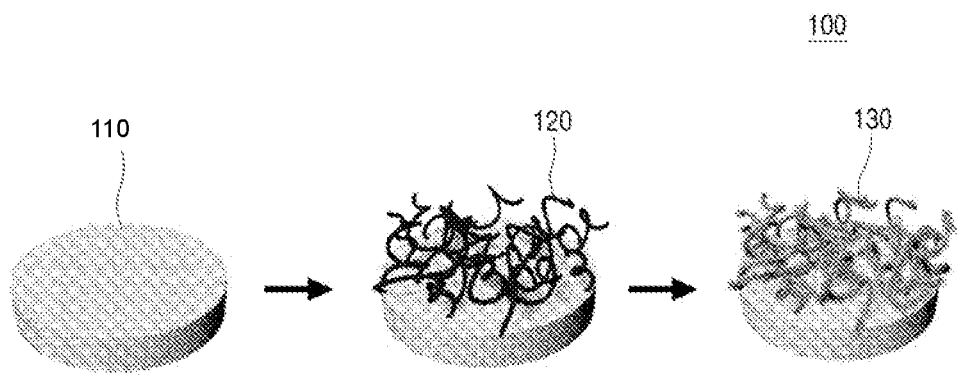
FIG. 1 is a view for describing a method for manufacturing a sulfur electrode according to an exemplary embodiment in the present disclosure.
Figure 2:
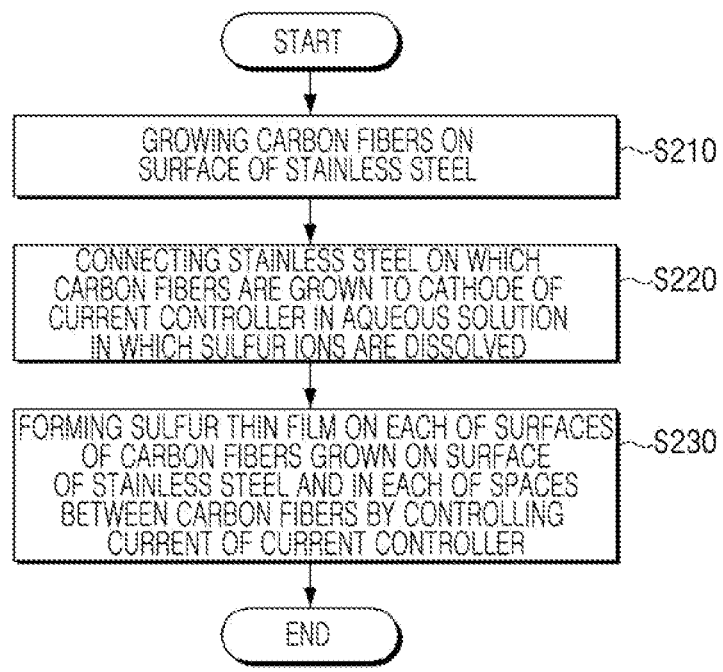
FIG. 2 is a flowchart of the method for manufacturing the sulfur electrode according to an exemplary embodiment in the present disclosure.

FIG. 1 is a view for describing a method for manufacturing a sulfur electrode according to an exemplary embodiment in the present disclosure, and FIG. 2 is a flowchart of the method for manufacturing the sulfur electrode according to an exemplary embodiment in the present disclosure. A process of manufacturing a sulfur electrode will be described below with reference to FIGS. 1 and 2. Stainless steel 110 is prepared. For example, the stainless steel may be in a form of a foil. Carbon fibers 120 are grown on a surface of the stainless steel 110 (S210). The carbon fibers may include a carbon nanotube (CNT), a carbon nanofiber (CNF), and the like. In the existing technology, a catalyst such as Ni or Fe is required to grow the carbon fibers. However, in the present disclosure, since stainless steel is used, a catalyst is not required. Therefore, carbon fibers having conductivity may be easily formed without an additional catalyst.

Before the carbon fibers are grown on the surface of the stainless steel, an etching step for the stainless steel may be additionally performed. As an exemplary embodiment, the etching step may be performed in the following order: adding stainless steel to a mixed solution of 190 ml of distilled water, 5 ml of nitric acid, 3 ml of hydrochloric acid, and 2 ml of hydrofluoric acid for about 30 seconds; washing the stainless steel; and drying the stainless steel. The surface of the stainless steel becomes rough by the etching step, and thus, a lot of sites where the carbon fibers are formed may be formed. Therefore, in a case in which the etching step is performed, more carbon fibers may be grown on the surface of the stainless steel.

A step of growing the carbon fibers will be described below in detail.

After the carbon fibers 120 are grown on the surface of the stainless steel 110, the stainless steel 110 on which the carbon fibers 120 are grown is connected to a cathode (+) of a current controller in an aqueous solution in which hydrogen sulfide is dissolved (S220). A sulfur thin film 130 is formed on each of surfaces of the carbon fibers 120 grown on the surface of the stainless steel 110 and in each of spaces between the carbon fibers 120 by controlling a current of the current controller (S230). That is, the sulfur thin film 130 is formed on each of the surfaces of the carbon fibers 120 and in each of the spaces between the carbon fibers 120 by an electroplating method. A specific step of forming the sulfur thin film will be described below in detail.

In the sulfur electrode manufactured through the process described above, the stainless steel 110, the carbon fiber 120, and the sulfur thin film may act as a current collector, a conductor, and an active material, respectively. In addition, in the sulfur electrode manufactured through the process described above, the sulfur thin film 130 is formed on each of the surfaces of the carbon fibers 120 and in each of the spaces between the carbon fibers 120, such that low conductivity and elution of lithium products that are disadvantages of the existing sulfur electrode may be prevented. That is, sulfur of the sulfur electrode reacts with lithium to form a gel-like reaction product. In the case of the existing sulfur electrode, the formed reaction product is eluted. However, in the case of the sulfur electrode of the present disclosure, elution of the reaction product may be prevented because the formed reaction product is adsorbed to the carbon fibers formed between the sulfur. In addition, in general, since sulfur is a non-conductive material, electrical conductivity of the sulfur electrode is low; however, the sulfur electrode of the present disclosure may have high conductivity because the sulfur may receive electrons from the carbon fibers.

Figure 3:
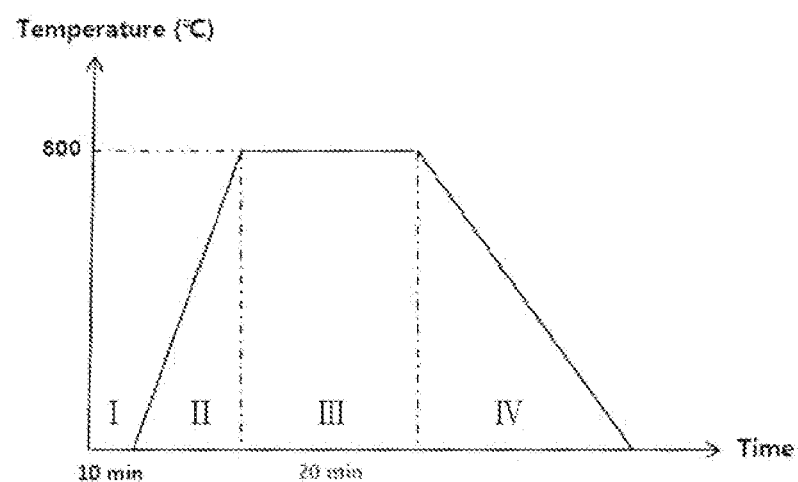
FIG. 3 is a view for describing growth conditions for carbon fibers according to an exemplary embodiment in the present disclosure.

FIG. 3 is a view for describing growth conditions for the carbon fibers according to an exemplary embodiment in the present disclosure.

Temperature and time conditions for growing the carbon fibers on the surface of the stainless steel are illustrated in FIG. 3. First, the stainless steel is placed in a tube, and Ar gas is injected (I region). For example, the Ar gas may be injected at 100 SCCM for 10 minutes. The injected Ar gas may flow in the tube and may be discharged in an opposite direction. Then, the temperature of the tube is increased to about 800° C. (II region). A percentage of the carbon fibers formed on the surface of the stainless steel may be changed depending on the temperature condition of the tube. Therefore, the temperature condition of 800° C. is an exemplary embodiment, and the step of growing the carbon fibers may proceed at a different temperature according to circumstances. In this case, $H_2$ gas and Ar gas may be injected into the tube at a ratio of about 50:100. The injected $H_2$ gas and Ar gas may flow in the tube and may be discharged in the opposite direction.

Next, the temperature of the tube is maintained at about 800° C. for about 20 minutes, and $C_2H_2$ gas is additionally injected (III region). In this case, $C_2H_2$ gas, $H_2$ gas, and Ar gas may be injected into the tube at a ratio of about 20:50:100. As described above, the $C_2H_2$ gas, $H_2$ gas, and Ar gas injected into the tube may flow in the tube and may be discharged in the opposite direction. Finally, the temperature of the tube is rapidly cooled while the $H_2$ gas and Ar gas are injected into the tube at a ratio of about 50:100 (IV region). The carbon fibers may be grown on the surface of the stainless steel through the step described above.

After the carbon fibers are grown on the surface of the stainless steel, the sulfur thin film is formed on each of the surfaces of the carbon fibers and in each of the spaces between the carbon fibers. A step of forming the sulfur thin film will be described below.

FIGS. 4 through 6c are views for describing a sulfur plating procedure according to an exemplary embodiment in the present disclosure.

Figure 4:
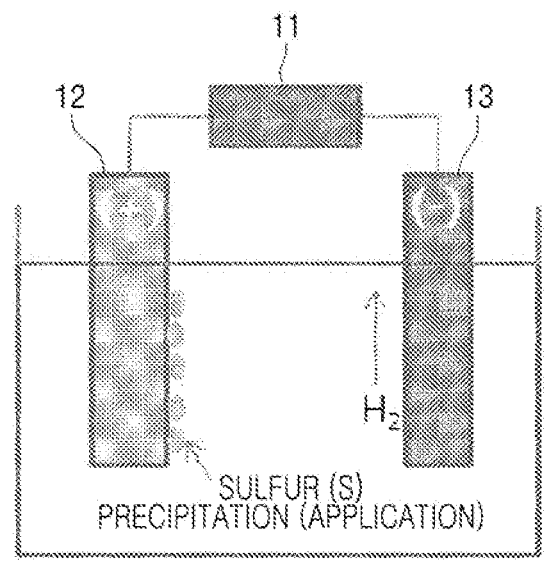
FIGS. 4 through 6C are views for describing a sulfur plating procedure according to an exemplary embodiment in the present disclosure.

Referring to FIG. 4, the stainless steel on which the carbon fibers are grown is connected to a cathode (12) of a current controller 11 in an aqueous solution in which hydrogen sulfide ($H_2S$) is dissolved. In addition, a conductive material may be connected to an anode 13 of the current controller 11. For example, the aqueous solution in which hydrogen sulfide ($H_2S$) is dissolved may be prepared by reacting sodium sulfide ($Na_2S$) with water ($H_2O$). When a current value of the current controller 11 is controlled, sulfur ions are oxidized at the cathode 12 of the current controller 11, and a sulfur thin film may be formed on each of the surfaces of the carbon fibers formed on the surface of the stainless steel and in each of the spaces between the carbon fibers. In addition, hydrogen ions are reduced at the anode 13 of the current controller 11, and hydrogen gas may be generated on a surface of the conductive material.

That is, the sulfur thin film may be formed on each of the surfaces of the carbon fibers grown on the stainless steel or in each of the spaces between the carbon fibers using an electroplating method. In general, the sulfur thin film formed in the electrode may be formed by a method of injecting sulfur powder or gas and performing a heat treatment. Alternatively, the sulfur thin film may be formed by a chemical treatment method of adding an electrode in a solution in which a sulfur component is dissolved and precipitating the sulfur component. Since sulfur is not a conductive material, in general, an electroplating method is not applied to the step of forming the sulfur thin film in the electrode.

It is difficult to control thicknesses or a degree of uniformity of the sulfur thin films to be formed in the electrode by the heat treatment method or chemical treatment method described above. However, in the case of the electroplating method described in the present disclosure, the thickness of the sulfur thin film to be formed on the surface of the carbon fiber may be controlled by controlling the current and time, and the sulfur thin films may be uniformly formed throughout the carbon fiber region.

Figure 5A:
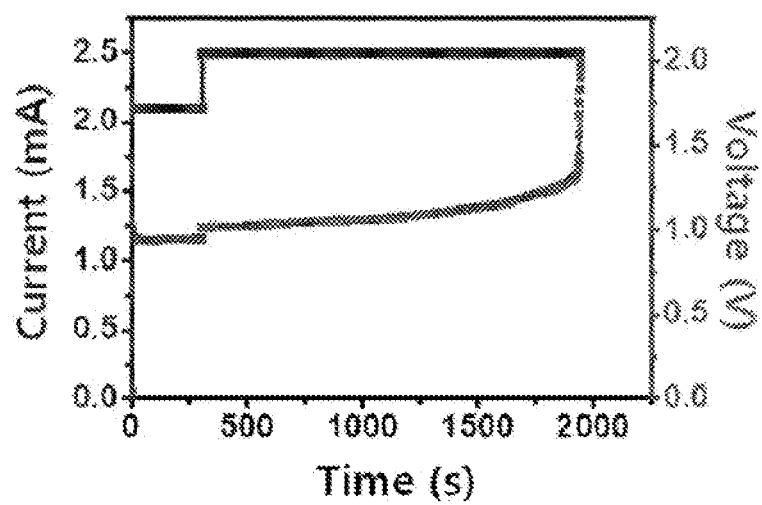
Figure 5B:
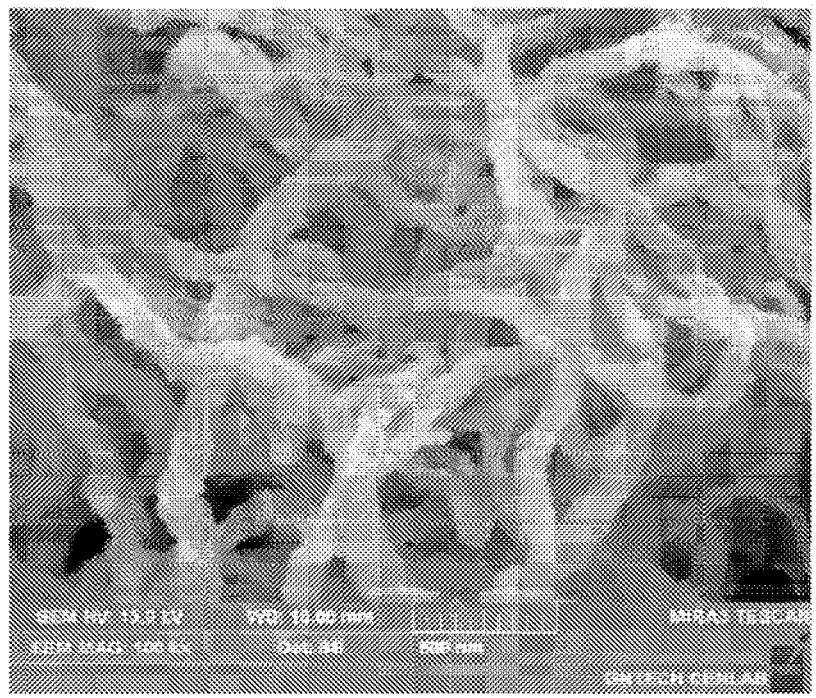
Figure 5C:
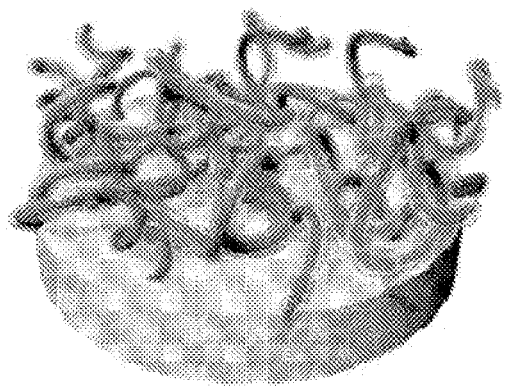
Figure 6A:
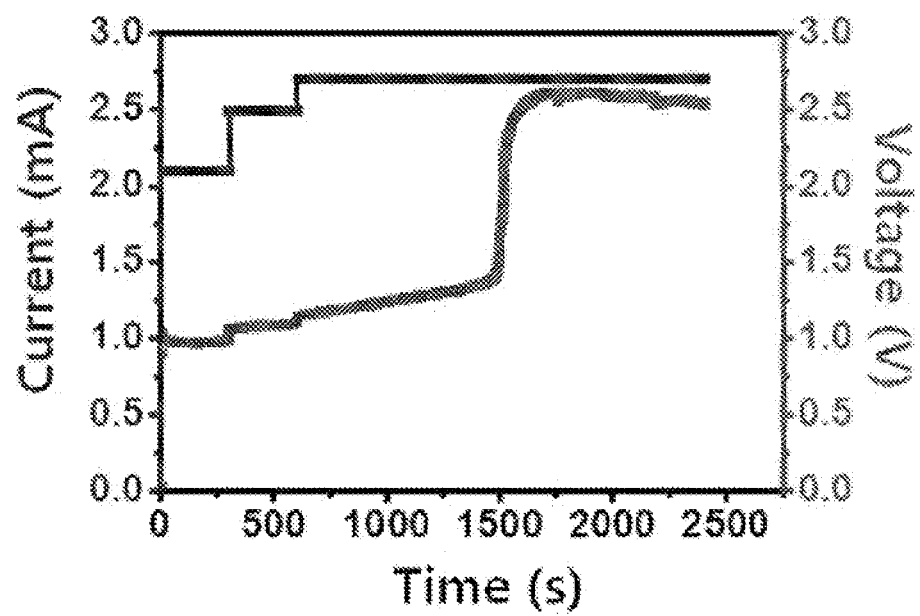
Figure 6B:
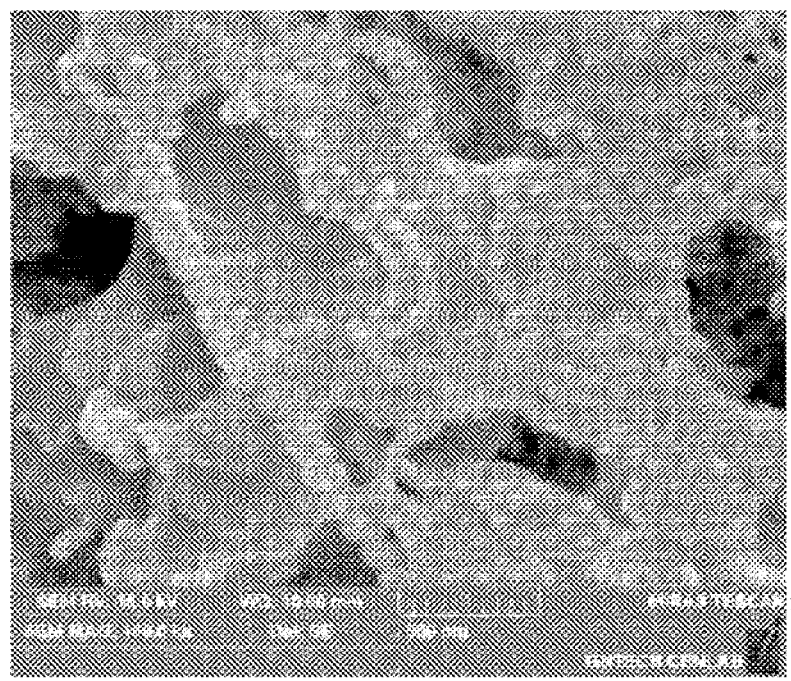
Figure 6C:
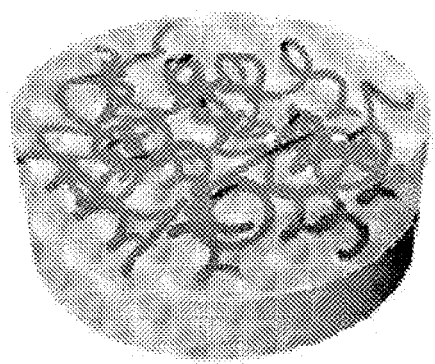

Current control graphs and the sulfur thin films formed on the surfaces of the carbon fibers and peripheries of the carbon fibers are illustrated in FIGS. 5a to 6c. FIGS. 5a to 5c are views illustrating a step of forming a sulfur thin film with a relatively low current value for a short time, and FIGS. 6a to 6c are views illustrating a step of forming a sulfur thin film with a relatively high current value for a long time.

Referring to FIG. 5a, the current of the current controller may be controlled to a value of about 2 mA/cm$^2$ for the first 500 seconds, and may be controlled to a value of about 2.5 mA/cm$^2$ for from 500 seconds to 2,000 seconds. A voltage value may be increased as the sulfur thin film is formed on the carbon fiber grown on the surface of the stainless steel. The voltage applied to the stainless steel may be maintained at lower than 3 V. When the voltage applied to the stainless steel is 3 V or higher, the electrode may be damaged. Therefore, the voltage applied to the stainless steel is required to be maintained at lower than 3 V.

A scanning electron microscope (SEM) image of the sulfur thin films formed on the carbon fibers under the conditions of FIG. 5a is illustrated in FIG. 5b, and the sulfur electrode in which sulfur is plated on the carbon fibers under the conditions of FIG. 5a is illustrated in FIG. 5c.

Referring to FIG. 6a, the current of the current controller may be sequentially increased to a value of about 2 mA/cm$^2$ until about 750 seconds have elapsed, a value of about 2.5 mA/cm$^2$, and a value of about 2.7 mA/cm$^2$, and may be controlled to a value of about 2.7 mA/cm$^2$ for from 750 seconds to 2,500 seconds. A scanning electron microscope (SEM) image of the sulfur thin films formed on the carbon fibers under the conditions of FIG. 6a is illustrated in FIG. 6b, and the sulfur electrode in which sulfur is plated on the carbon fibers under the conditions of FIG. 6a is illustrated in FIG. 6c.

When comparing FIGS. 5b and 6b, in the case in which the sulfur thin film is formed by controlling the current controller with a relatively high current value for a long time, more sulfur thin films may be formed on the surfaces and in peripheral spaces of the carbon fibers.

That is, when the sulfur thin film is formed by an electroplating method, the sulfur thin films may be appropriately formed on the surfaces of the carbon fibers and in the spaces between the carbon fibers by controlling the current value of the current controller and the time according to a carbon fiber volume and a thickness of a sulfur thin film to be formed.

Figure 7A:
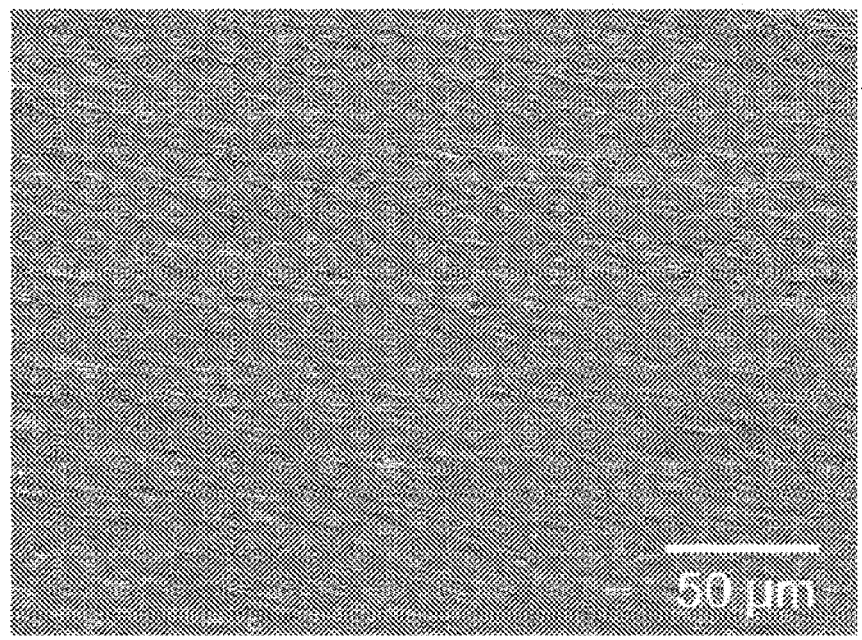
FIGS. 7A through 7D are views illustrating a sulfur electrode material according to an exemplary embodiment in the present disclosure.
Figure 7B:
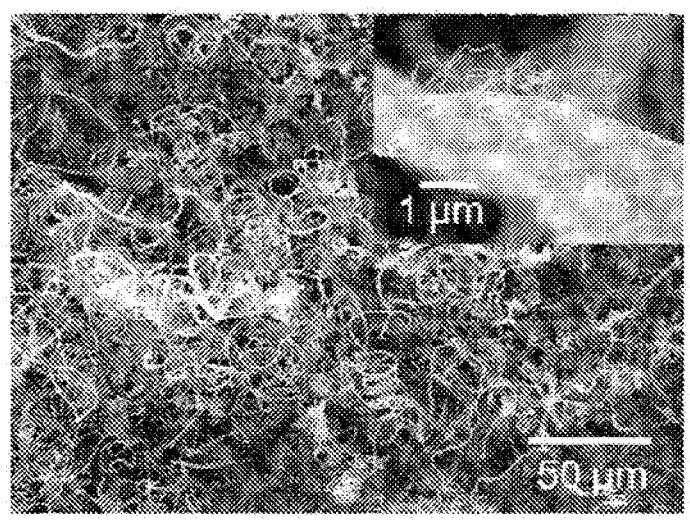

FIGS. 7a through 7d are views illustrating a sulfur electrode material according to an exemplary embodiment in the present disclosure. An SEM image of the stainless steel before the carbon fibers are grown thereon is illustrated in FIG. 7a, and an SEM image of the carbon fibers grown on the surface of the stainless steel is illustrated in FIG. 7b.

Figure 7C:
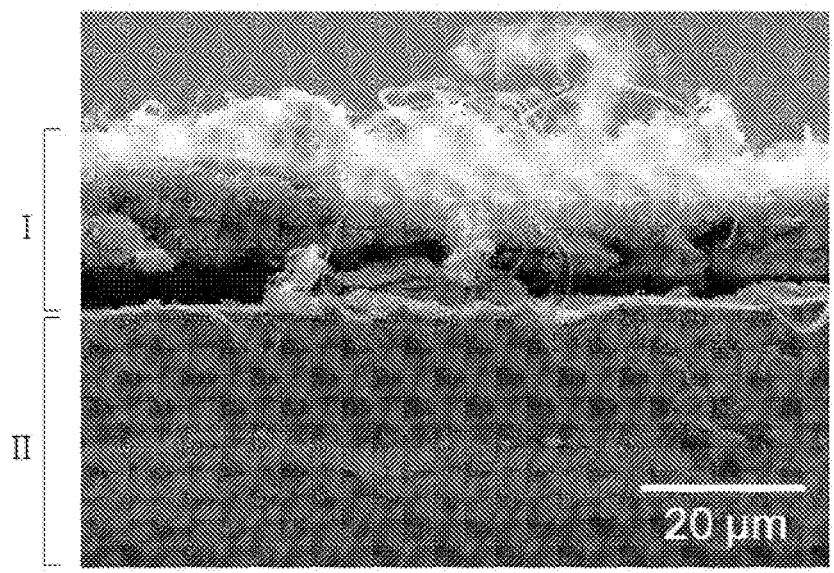
Figure 7D:

An SEM image of a cross section of the stainless steel including the formed sulfur thin films and the grown carbon fibers is illustrated in FIG. 7c, and an energy disperse X-ray spectrometer (EDS) mapping image of the cross section of the stainless steel including the formed sulfur thin films and the grown carbon fibers is illustrated in FIG. 7d. In each of FIGS. 7c and 7d, the I region indicates the carbon fibers on which the sulfur thin films are formed, and the II region indicates the stainless steel. Referring to FIGS. 7c and 7d, it may be appreciated that the sulfur thin films are uniformly formed on the surfaces of the carbon fibers and in the spaces between the carbon fibers.

FIGS. 8a through 9b are views illustrating carbon fibers plated with sulfur according to an exemplary embodiment in the present disclosure.

Figure 8A:
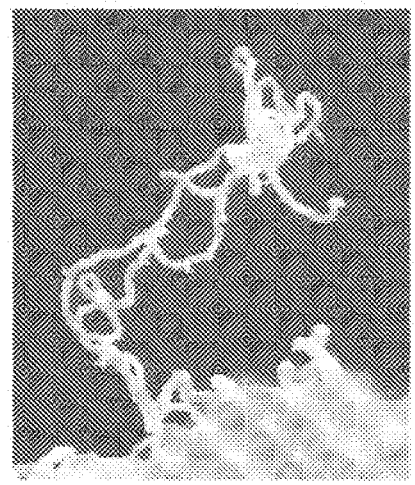
FIGS. 8A through 9B are views illustrating carbon fibers plated with sulfur according to an exemplary embodiment in the present disclosure.
Figure 8B:
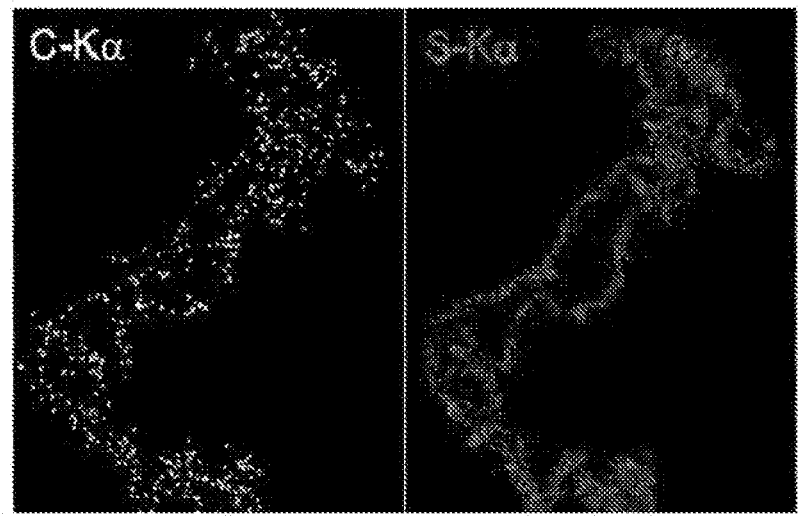
Figure 9A:
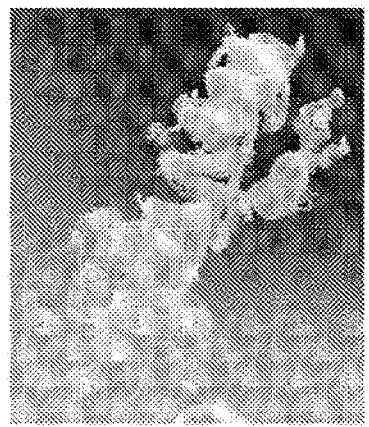
Figure 9B:
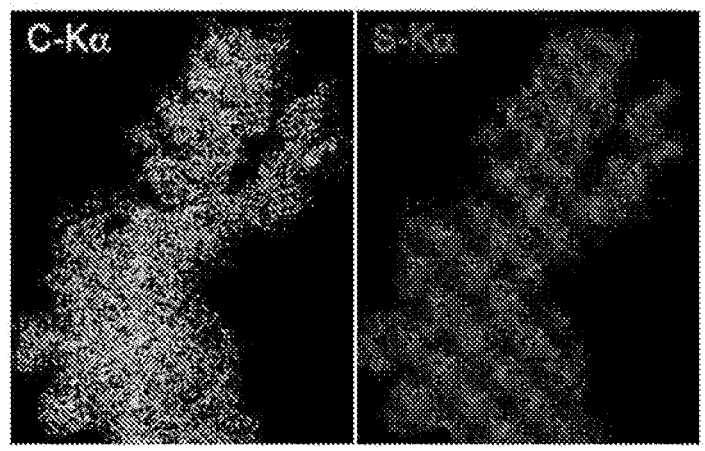

FIG. 8a is an SEM image of the relatively small sized carbon fibers on which the sulfur thin films are formed, and FIG. 8b is an EDS mapping image. FIG. 9a is an SEM image of the relatively large sized carbon fibers on which the sulfur thin films are formed, and FIG. 9b is an EDS mapping image. The sizes and amount of the carbon fibers may be adjusted by controlling the temperature and time when growing the carbon fibers on the surface of the stainless steel. Referring to the images of FIGS. 9a and 9b, it may be appreciated that more carbon fiber or sulfur distributions are included in the image of each of FIGS. 8a and 8b.

Figure 10:
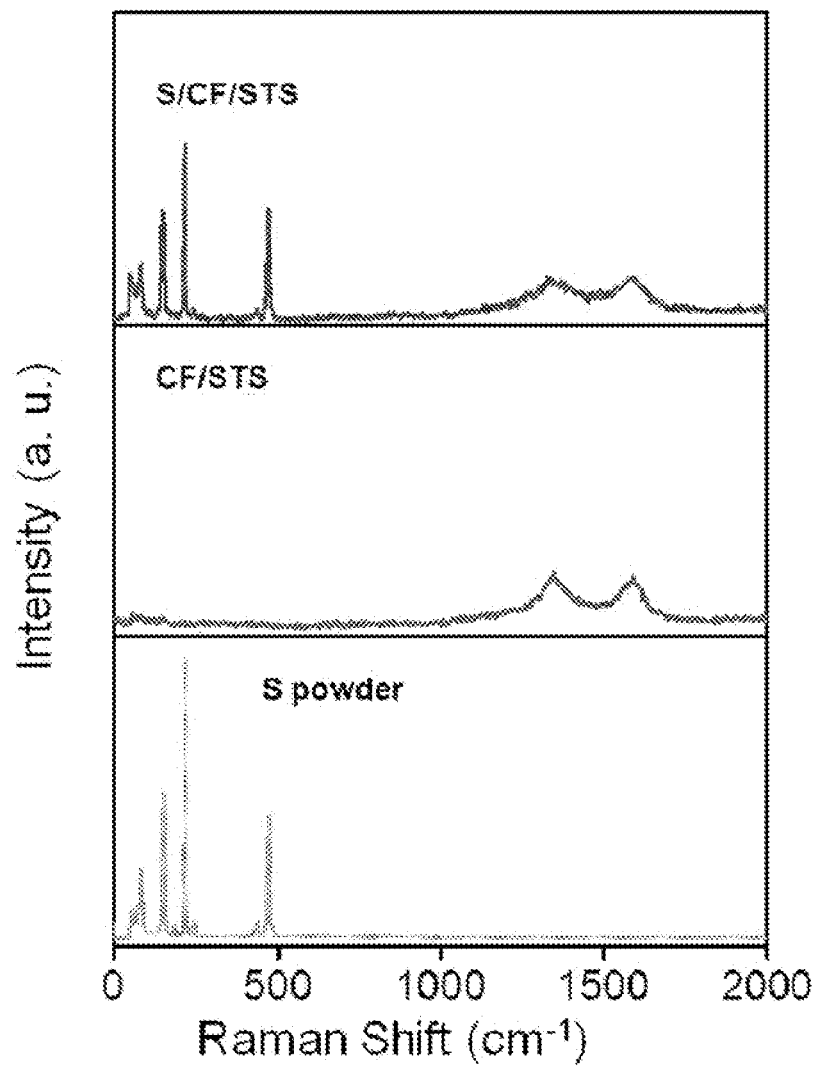
FIG. 10 is a view illustrating a result of analyzing components of the sulfur electrode according to an exemplary embodiment in the present disclosure.

FIG. 10 is a view illustrating results of analyzing components of the sulfur electrode according to an exemplary embodiment in the present disclosure. A result of measuring a Raman shift of the sulfur electrode including the sulfur thin films, the carbon fibers, and the stainless steel is illustrated in FIG. 10. A region of the stainless steel and carbon fiber components and a region of sulfur powder appear separately due to a natural oscillation frequency of the molecule. The amount of the carbon fibers and the stainless steel included in the sulfur electrode including the sulfur thin films, the carbon fibers, and the stainless steel and the amount of the formed sulfur thin films may be illustrated.

The sulfur electrode according to the present disclosure may be stably charged and discharged.

Figure 11A:
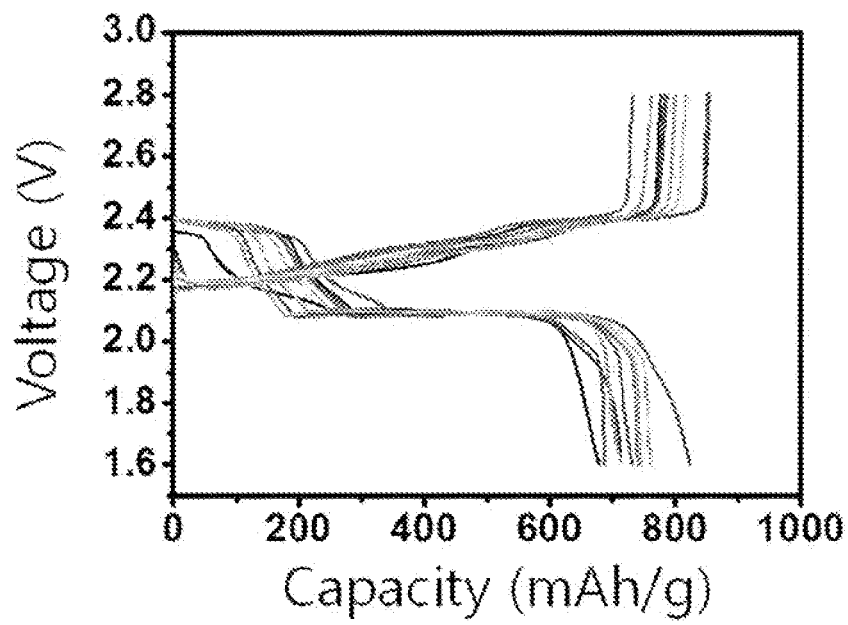
FIGS. 11A and 11B are views illustrating results of a charge and discharge test for the sulfur electrode according to an exemplary embodiment in the present disclosure.
Figure 11B:
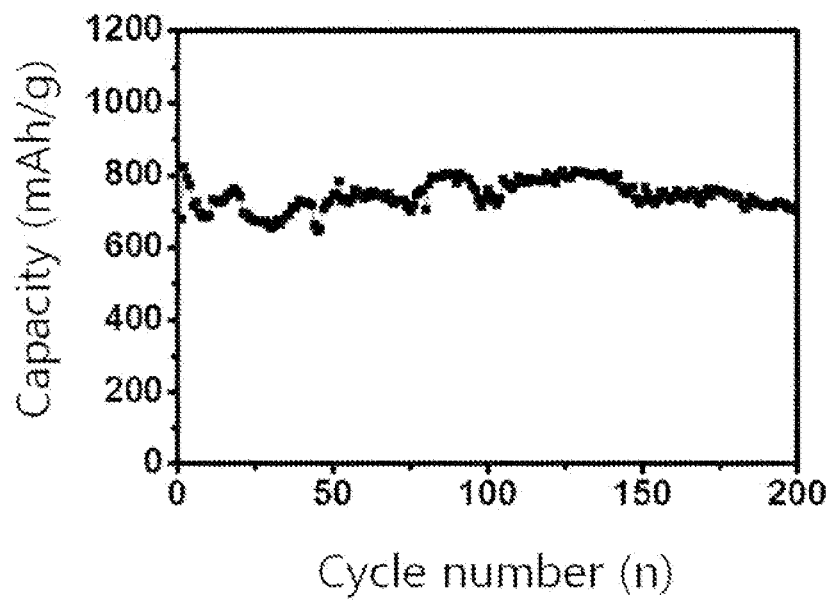

FIGS. 11a and 11b are views illustrating results of a charge and discharge test for the sulfur electrode according to an exemplary embodiment in the present disclosure.

The results of repeated charge and discharge tests for the sulfur electrode are illustrated in FIG. 11a. Each line of FIG. 11a indicates a relationship between a voltage and a capacity according to the number of charge and discharge cycles. Referring to FIG. 11a, it may be appreciated that a battery having a capacity of 700 mAh/g to 800 mAh/g may be manufactured using the sulfur electrode of the present disclosure, and the charge and discharge capacity may be continuously maintained even when charging and discharging are repeatedly performed 200 times.

The results of the test for the capacity of the sulfur electrode when discharging is repeated are illustrated in FIG. 11b. Referring to FIG. 11b, the sulfur electrode of the present disclosure may maintain a capacity of about 700 mAh/g even when discharging is performed 200 times.

Meanwhile, the stainless steel of the present disclosure may be a porous stainless steel foil type. Porous stainless steel refers to stainless steel having a plurality of holes. In a case in which carbon fibers are grown on the porous stainless steel, the carbon fibers may be grown on both surfaces of the porous stainless steel. In a case in which carbon fibers are grown on both surfaces of the porous stainless steel, sulfur may be formed on surfaces of the carbon fibers grown on the both surfaces of the porous stainless steel and in peripheral spaces of the carbon fibers. Therefore, a sulfur electrode having both surfaces on which carbon fibers are grown may theoretically have twice the capacity of a sulfur electrode having one surface on which carbon fibers are grown. In addition, in the sulfur electrode of the present disclosure, an electrolyte may be delivered through the holes of the porous stainless steel, such that a plurality of electrodes may be configured, and a capacity per area may be increased.

FIGS. 12a through 12e are views illustrating porous stainless steel and porous stainless steel on which carbon fibers are grown according to an exemplary embodiment in the present disclosure.

Figure 12A:
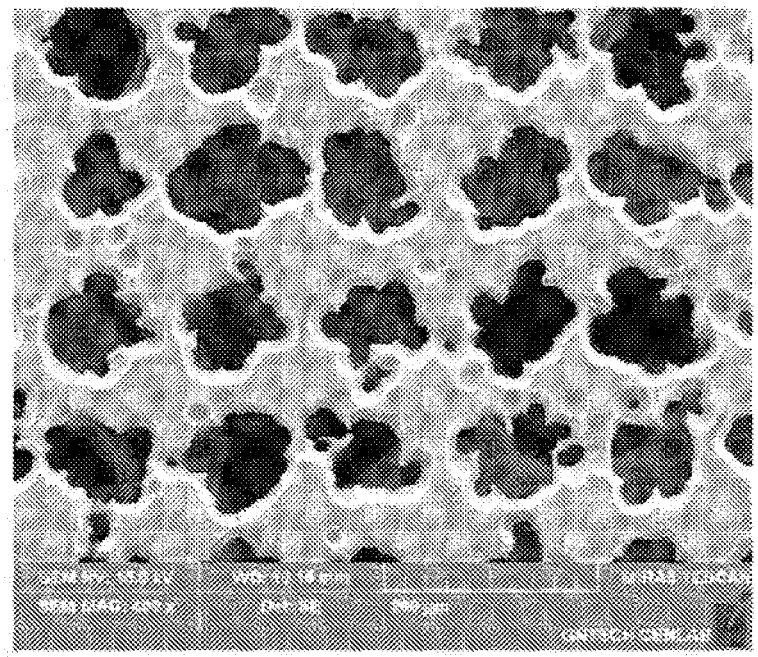
FIGS. 12A through 12E are views illustrating porous stainless steel and porous stainless steel on which carbon fibers are grown according to an exemplary embodiment in the present disclosure.
Figure 12B:
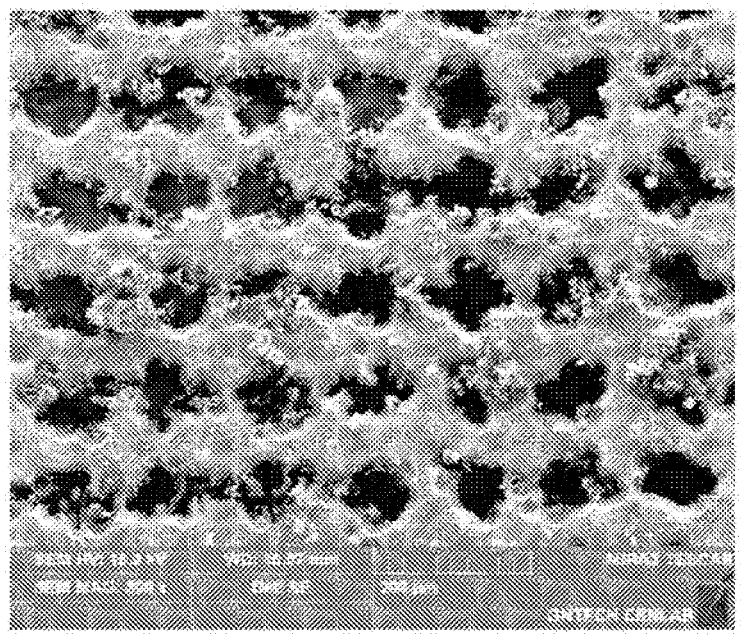
Figure 12C:
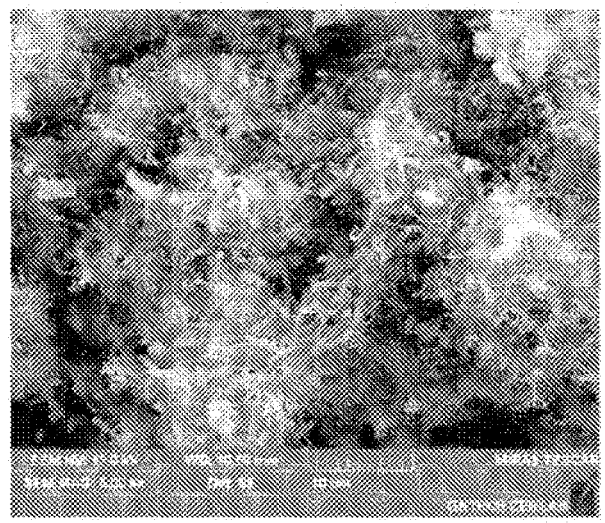
Figure 12D:
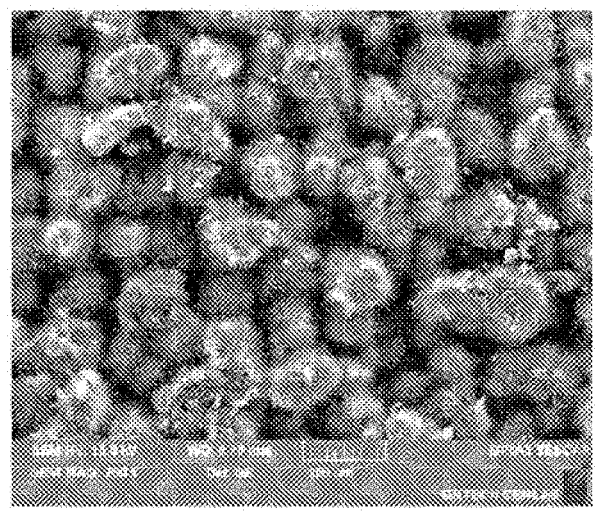
Figure 12E:
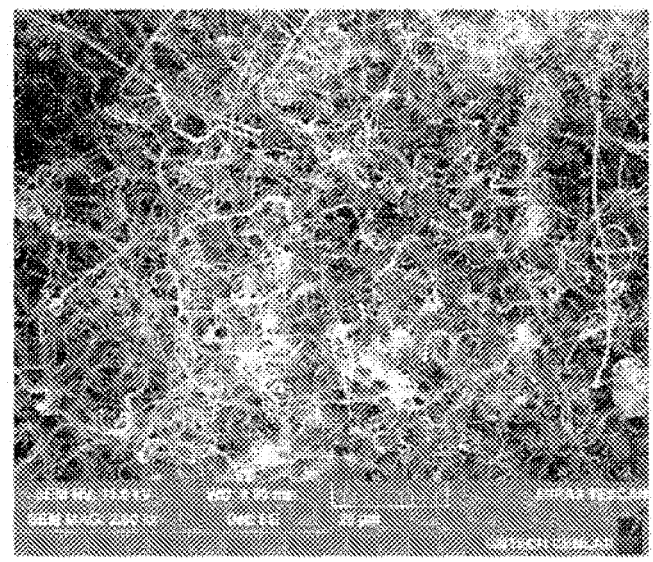

An SEM image of the porous stainless steel is illustrated in FIG. 12a. As described above, the porous stainless steel refers to stainless steel having a surface having holes. FIG. 12b is an SEM image of porous stainless steel on which carbon fibers are grown at about 700° C., and FIG. 12c is an SEM image of carbon fibers grown on a surface of porous stainless steel at about 700° C. FIG. 12d is an SEM image of porous stainless steel on which carbon fibers are grown at about 800° C., and FIG. 12e is an SEM image of carbon fibers grown on a surface of porous stainless steel at about 800° C. When comparing FIGS. 12b and 12d, in the case in which the carbon fibers are grown at a high temperature, the carbon fibers may be more densely grown on the surface of the porous stainless steel.

Figure 13:
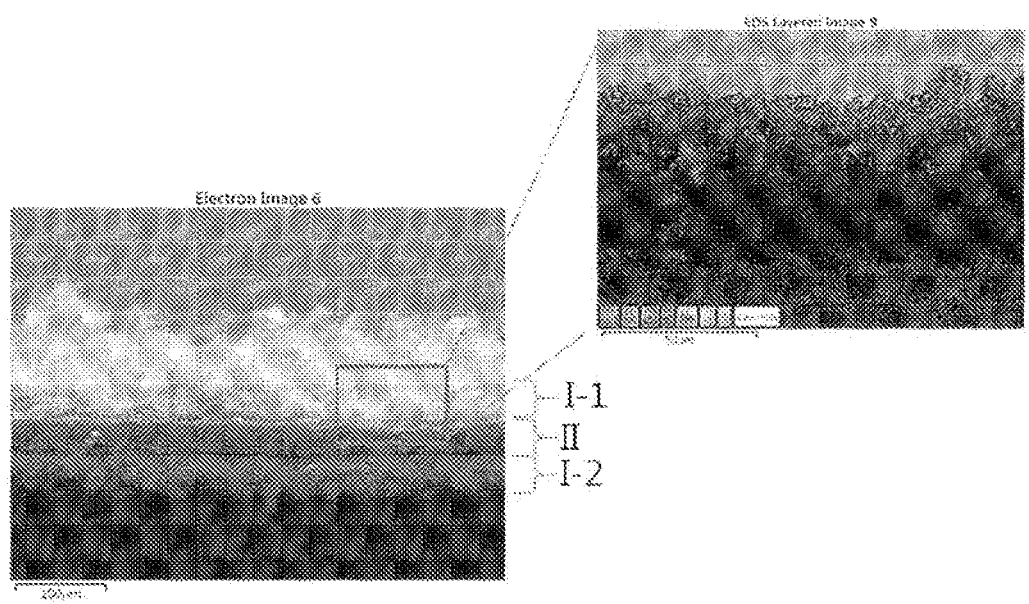
FIG. 13 is a view illustrating a cross section of porous stainless steel on which carbon fibers are grown according to an exemplary embodiment in the present disclosure.

FIG. 13 is a view illustrating a cross section of porous stainless steel on which carbon fibers are grown according to an exemplary embodiment in the present disclosure.

An SEM image of a cross section of a sulfur electrode in which carbon fibers are grown on both surfaces of porous stainless steel and sulfur is formed on surfaces of the grown carbon fibers and in spaces of between grown carbon fibers is illustrated in FIG. 13. In FIG. 13, the II region is a porous stainless steel region, and the I-1 region and the I-2 region are regions in which the carbon fibers and sulfur are formed. A red part of an EDS matching image obtained by enlarging an upper portion of a cross section of the sulfur electrode indicates sulfur. As illustrated in FIG. 13, when the carbon fibers are grown on the porous stainless steel, the carbon fibers may be grown on both surfaces of the porous stainless steel, and the sulfur may be formed on the surfaces of the carbon fibers and in peripheral spaces of the carbon fibers.

Figure 14A:
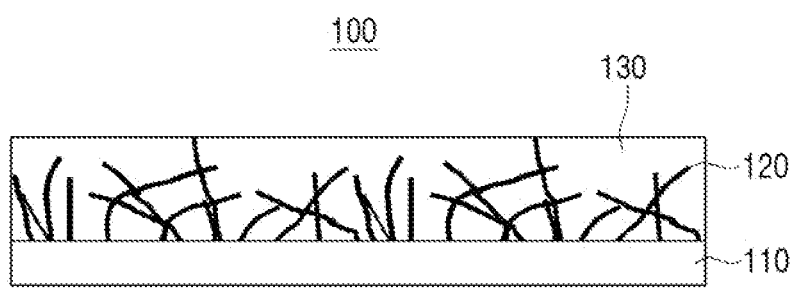
FIG. 14A through 14C are views for describing various types of sulfur electrodes according to an exemplary embodiment in the present disclosure.
Figure 14B:
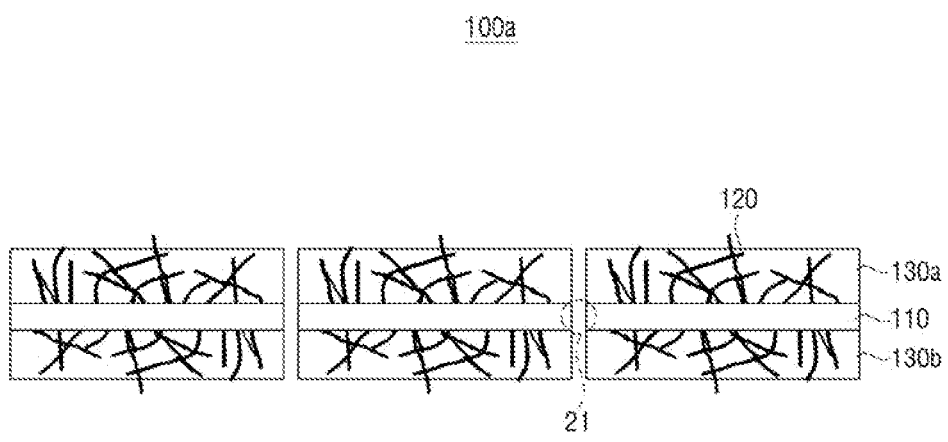
Figure 14C:
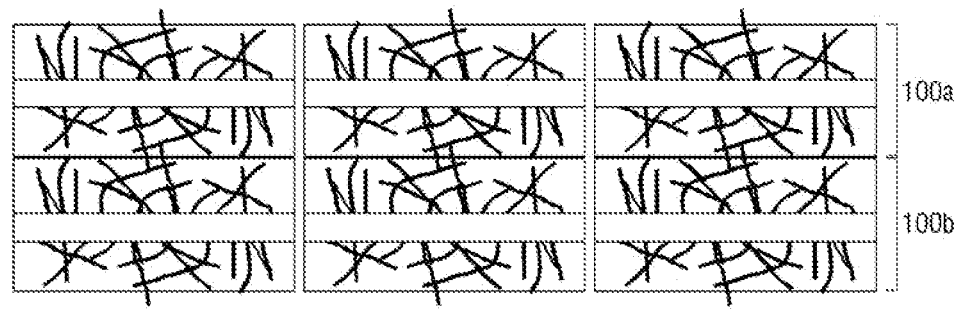

FIG. 14a through 14c are views for describing various types of sulfur electrodes according to an exemplary embodiment in the present disclosure.

A sulfur electrode 100 in which carbon fibers 120 and sulfur 130 are formed on one surface of stainless steel 110 is illustrated in FIG. 14a. In a case in which the stainless steel 110 does not have a porous structure, the carbon fibers 120 are grown on one surface of the stainless steel 110, and the sulfur 130 is formed on surfaces of the carbon fibers 120 grown on the one surface of the stainless steel 110 and in peripheral spaces of the carbon fibers 120.

A sulfur electrode 100a in which carbon fibers 120 and sulfurs 130a and 130b are formed on both surfaces of porous stainless steel 110a is illustrated in FIG. 14b. In a case in which the stainless steel 110a has a porous structure, a plurality of holes 21 are included in the surface of the stainless steel 110a. The carbon fibers 120 may be grown on the both surfaces of the porous stainless steel 110a through the plurality of holes 21, and the sulfurs 130a and 130b may be formed on surfaces of the carbon fibers 120 grown on the both surfaces of the porous stainless steel and in the peripheral spaces of the carbon fibers 120.

Meanwhile, when a plurality of sulfur electrodes in which the carbon fibers and the sulfurs are formed on the both surfaces of the porous stainless steel are combined, a large-capacity sulfur electrode may be implemented.

A large-capacity sulfur electrode obtained by combining a plurality of sulfur electrodes is illustrated in FIG. 14c. The large-capacity sulfur electrode may have a structure obtained by combining the sulfur electrodes 100a and 100b in which the carbon fibers and the sulfurs are formed on the both surfaces of the porous stainless steel. For example, the large-capacity sulfur electrode may be implemented by stacking a plurality of double-sided sulfur electrodes 100a and 100b. Each of the double-sided sulfur electrodes 100a and 100b includes the porous stainless steel, such that a liquid electrolyte may be supplied through the holes. Although two double-sided sulfur electrodes 100a and 100b that are stacked are illustrated in FIG. 14c, a large-capacity sulfur electrode may be implemented by stacking three or more double-sided sulfur electrodes.

Figure 15:
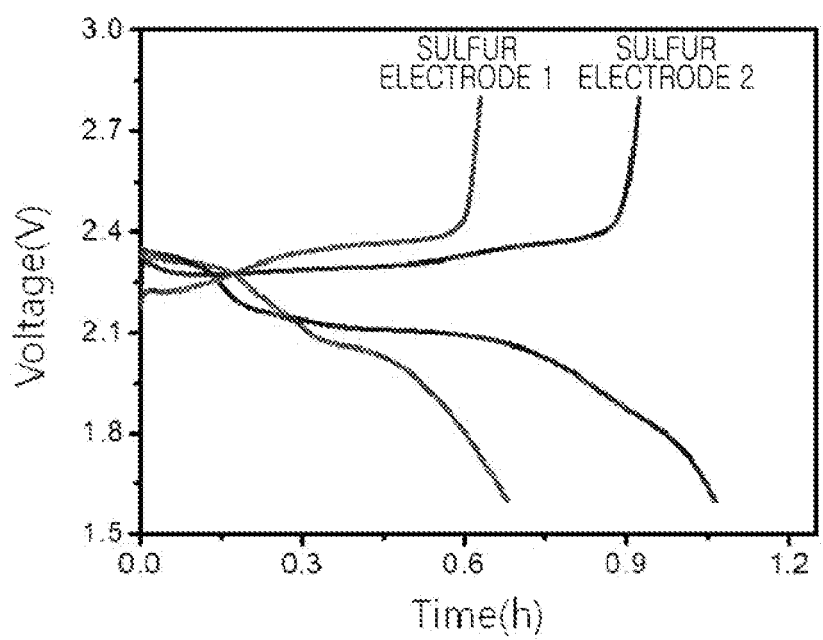
FIG. 15 is a view for describing results of a charge and discharge test for a sulfur electrode in which carbon fibers are grown on one surface of stainless steel and a sulfur electrode in which carbon fibers are grown on both surfaces of stainless steel according to an exemplary embodiment in the present disclosure.

FIG. 15 is a view for describing results of a charge and discharge test for a sulfur electrode in which carbon fibers are grown on one surface of stainless steel and a sulfur electrode in which carbon fibers are grown on both surfaces of stainless steel according to an exemplary embodiment in the present disclosure.

Referring to FIG. 15, a sulfur electrode 1 indicates the result of the charge and discharge test for the sulfur electrode in which carbon fibers and sulfurs are formed on one surface of stainless steel, and a sulfur electrode 2 indicates the result of the charge and discharge test for the sulfur electrode in which carbon fibers and sulfurs are formed on both surfaces of stainless steel. The sulfur electrode in which carbon fibers and sulfurs are formed on both surfaces of stainless steel may theoretically have about twice the capacity of the sulfur electrode in which carbon fibers and sulfurs are formed on one surface of stainless steel. However, since the amount of carbon fibers formed on a lower surface of the porous stainless steel is smaller than the amount of carbon fibers formed on an upper surface of the porous stainless steel, a capacity gap is not twice. However, the sulfur electrode in which carbon fibers and sulfurs are formed on both surfaces of stainless steel may have a higher capacity than that of the sulfur electrode in which carbon fibers and sulfurs are formed on one surface of stainless steel.

Meanwhile, a battery including the sulfur electrode according to the present disclosure may be manufactured. The battery including the sulfur electrode according to the present disclosure may supplement the disadvantages of the existing sulfur electrode described above. In addition, the sulfur electrode of the present disclosure may be applied to a general coin cell battery. As an exemplary embodiment, a coin cell manufacturer may implement an electrode for a cathode of a general coin cell battery by directly growing carbon fibers on stainless steel (can) of the general coin cell battery and forming sulfur.

Although preferred exemplary embodiments of the present disclosure have been illustrated and described hereinabove, the present disclosure is not limited to the specific exemplary embodiments described above, but may be variously modified by those skilled in the art to which the present disclosure pertains without departing from the gist of the disclosure as claimed in the claims. These modifications should also be understood to fall within the technical spirit and scope of the present disclosure.

The invention claimed is:

1. A method for manufacturing a sulfur electrode, comprising:
    growing carbon fibers on a surface of stainless steel;
    connecting the stainless steel on which the carbon fibers are grown to a cathode of a current controller in an aqueous solution in which sulfur ions are dissolved; and
    forming a sulfur thin film on each of surfaces of the carbon fibers grown on the surface of the stainless steel and in each of spaces between the carbon fibers by controlling a current of the current controller.

2. The method of claim 1, wherein the stainless steel has a porous foil structure.

3. The method of claim 2, wherein in the growing the carbon fibers, the carbon fibers are grown on both surfaces of the stainless steel having the porous foil structure.

4. The method of claim 1, wherein in the forming the sulfur thin film, the current controller is controlled so that the current of the current controller is applied with a preset current value and power is supplied to the cathode for a time during which a voltage of the cathode does not exceed 3 V.

5. A sulfur electrode comprising:
    a current collector including stainless steel having a surface on which carbon fibers are grown; and
    an active material formed into a sulfur thin film formed on a periphery of each of the carbon fibers,
    wherein the active material is formed on each of surfaces of the carbon fibers and in each of spaces between the carbon fibers in an aqueous solution in which sulfur ions are dissolved by controlling a current controller.

6. The sulfur electrode of claim 5, wherein the current collector includes stainless steel having a porous foil structure.

7. The sulfur electrode of claim 6, wherein the stainless steel having the porous foil structure in the current collector has both surfaces on which the carbon fibers are grown, and the sulfur electrode includes at least one current collector.

8. A battery comprising the sulfur electrode of claim 5.

* * * * *